Patented Sept. 26, 1950

2,523,946

UNITED STATES PATENT OFFICE 2,523,946

PRODUCTION OF DULL LACQUER FINISHES

Alan Dowbiggin, Lancaster, England, assignor to Storey Brothers and Company Limited, White Cross Mills, Lancaster, Lancaster, England No Drawing. Application January 21, 1948, Serial No. 3,547. In Great Britain February 6, 1947

10 Claims. (Cl. 260—17)

This invention relates to the production of dull lacquer finishes such as are often required, for example, on artificial leathercloth.

Hitherto in the preparation of dulling lacquers for the dulling of artificial leathercloth and the like or more rigid bodies, it has been usual to utilise a nitrocellulose solution in which was dispersed opaque matter of small particle size, suitably ground if necessary, such as pigments, ochres, earths or salts such as aluminum stearate and the like. Each of these presented particular difficulties usually associated with dispersion and instability, and it is known that an improvement upon the aforementioned ochres, earths and the like can be obtained by precipitation of an alcohol-insoluble nitrocellulose in an essentially alcoholic solution of an alcohol-soluble nitrocellulose giving by such means dulling lacquers. From the industrial point of view, however, this method suffers from the defect of being difficult to control and in addition since the nitrocellulose which constitutes the continuous phase is the alcohol-soluble variety, it is necessarily of the low nitrogen type and, therefore, gives a film which does not possess the tensile strength which might be desired.

The object of the present invention is to provide a dull lacquer finish which will not suffer from any of the disadvantages referred to above and which may be more easily prepared than the known finishes.

The invention consists in a method of producing a dull lacquer finish by mixing a solution of nitrocellulose with a solution of a suitable resin soluble in alcohol or aqueous alcohol.

The invention also consists in a method according to the preceding paragraph in which the resin employed is a modified polyvinyl acetal such, for example, as those known as polyvinyl butyral and acetate.

According to the invention the nitrocellulose employed may be either the alcohol-soluble or the alcohol-insoluble nitrocellulose, and the method of procedure differs somewhat according to which is used. In either case I obtain in the resulting lacquer film a dispersion of discrete particles of nitrocelluluose which being opaque or semi-opaque, constitute the dulling agent. When using alcohol-soluble nitrocelluloses I need only add a proportion of water to the alcohol to effect precipitation of the nitrocellulose without affecting, however, the stability of the polyvinyl butyral.

In carrying my invention into effect I either prepare two solutions, one of nitrocellulose known as industrial nitrocellulose, that is, having a nitrogen content (as $N_2$) of 12.3% or less dissolved in a suitable solvent, and another of polyvinyl butyral dissolved also in a suitable solvent; or a solution of nitrocellulose as previously referred to, to which the polyvinyl butyral resin is added in the dry form followed by a suitable solvent. The former method I refer to as the two solution method and the latter as the dry solution method. In the case of the two solution method I find it convenient to have the nitrocellulose solution of not greater than 35% solid content, and that of the polyvinyl butyral not less than 10% solid content in order to ensure the particle size of the precipitated nitrocellulose being small and uniform. The solutions are mixed together with constant stirring until homogeneous.

In the case of the dry solution method I prefer that the nitrocellulose solution be less than 20% solid content but the solid content of each or any of the solutions may be varied as desired within wide limits.

In either case the mixture is further diluted with alcohol which acts as a precipitating agent for the alcohol-insoluble nitrocellulose, and is then ready for application.

In the following examples I give the proportions in a typical case for the preparation of a dull lacquer containing respectively an alcohol-insoluble nitrocellulose and an alcohol-soluble nitrocellulose.

The term alcohol soluble nitrocellulose generally understood to cover one having a nitrogen content falling between the limits 10.5 to 11.2 per cent, and the term alcohol insoluble nitrocellulose to cover one having a nitrogen content of 11.8 to 12.3 per cent. The alcohol insoluble nitrocellulose are readily soluble in esters and ketones but their solubility in alcohol is low. The alcohol soluble nitrocellulose is soluble in weaker solvents containing much more alcohol than the alcohol insoluble nitrocellulose grade. References to the alcohol soluble and the alcohol insoluble nitrocellulose are intended, therefore, to imply a degree of tolerance to alcohol.

EXAMPLE I

*Solution A*

25 parts by weight nitrocellulose
25 parts by weight acetone
50 parts by weight industrial spirits

*Solution B*

25 parts by weight polyvinyl butyral
75 parts by weight industrial spirits 100 parts by weight of Solution A are mixed with 120 parts by weight of Solution B in a convenient mixing machine of standard type and diluted with 100 parts by weight or more or less of industrial spirits serving as a precipitating agent.

EXAMPLE II

Solution A 25 parts by weight nitrocellulose
25 parts by weight acetone
50 parts by weight industrial spirits

Solution B 25 parts by weight polyvinyl butyral
75 parts by weight industrial spirits 100 parts by weight of Solution A are mixed with 120 parts by weight of Solution B in a convenient mixer of standard type and diluted with 50 parts by weight of industrial spirits and 3 parts by weight of water serving as a precipitating agent.

In the following example the nitrocellulose is of the same type as in Example I.

EXAMPLE III 25 parts by weight nitrocellulose
18.75 parts by weight acetone
56.25 parts by weight industrial spirits To this solution is added with constant stirring:

14 parts by weight polyvinyl butyral
42 parts by weight industrial spirits

When solution is completed 60 parts by weight of industrial spirits are added serving as a precipitating agent.

Should it be desired to make a more pliable dull lacquer it is merely necessary to add the desired quantity of softener such as:

Castor oil
Tri-cresyl phosphate
Di-butyl phthalate
Butyl Cellosolve phthalate to Solution B in the first two examples and to the completed solution in Example III. The amount of softener can be varied from 5% upwards but it is not found desirable to add more than 50% on the combined nitrocellulose/polyvinyl butyral content.

The lacquer may be applied by spreading, spraying, or other method normally employed by those skilled in the art of leathercloth manufacture, and in the application of the lacquer the method is not restricted to an embossed specimen of leathercloth, that is to say, it may be applied to a leathercloth on which a design has been impressed or, alternatively, it may be applied to unembossed, that is, plain leathercloth, the latter being embossed subsequently as desired without detriment to the dullness of the lacquer.

It will also be understood that the proportions of the various ingredients given above are by way of example only, and that my improved lacquer may be applied to materials other than leathercloth.

I claim:

1. In the preparation of dull lacquers, the process which comprises preparing a homogeneous solution in an alcohol containing solvent of nitrocellulose and an alcohol-soluble polyvinyl acetal resin, and adding a precipitating agent for the nitrocellulose to produce a dispersion of discrete particles of nitrocellulose.

2. The process of claim 1 wherein the said homogeneous solution is prepared by mixing solutions of the nitrocellulose and the polyvinyl acetal resin.

3. The process of claim 1 wherein the said homogeneous solution is prepared by dissolving the polyvinyl acetal in a solution of the nitrocellulose.

4. In the preparation of dull lacquers, the process which comprises preparing a homogeneous solution in an alcohol-containing solvent of nitrocellulose and an alcohol-soluble polyvinyl resin selected from the class consisting of polyvinyl acetate and polyvinyl butyral and adding a precipitating agent for the nitrocellulose to produce a dispersion of discrete particles of nitrocellulose.

5. The process of claim 4 wherein the nitrocellulose is an alcohol-insoluble nitrocellulose and the precipitating agent employed is alcohol.

6. The process of claim 4 wherein the nitrocellulose is an alcohol-soluble nitrocellulose and the precipitating agent employed is water.

7. The process of claim 4 wherein the nitrocellulose employed is one having a nitrogen content of not exceeding 12.3 per cent.

8. The process of claim 4 wherein a softener is added in the amount of from 5 to 50 per cent by weight based on the combined weight of the nitrocellulose and polyvinyl acetal.

9. In the preparation of dull lacquers the process which comprises preparing a homogeneous solution in an alcoholic solvent of nitrocellulose and polyvinyl butyral, and adding a precipitating agent for the nitrocellulose to produce a dispersion of discrete particles of nitrocellulose.

10. In the preparation of dull lacquers the process which comprises preparing a solution in an alcoholic solvent of a nitrocellulose having a nitrogen content not exceeding 12.3 per cent by weight, said solution having a concentration of nitrocellulose not exceeding 35 per cent by weight, preparing a solution of polyvinyl butyral in an alcoholic solvent containing not less than 10 per cent by weight of polyvinyl butyral, mixing the two solutions and adding a precipitating agent for the nitrocellulose to produce a dispersion of discrete particles of nitrocellulose.

ALAN DOWBIGGIN.

REFERENCES CITED

The following references are of record in the file of this patent:

UNITED STATES PATENTS

| Number | Name | Date |
|---|---|---|
| 2,293,558 | Overholt | Aug. 18, 1942 |

FOREIGN PATENTS

| Number | Country | Date |
|---|---|---|
| 14,583 | Australia | Aug. 23, 1934 |
| 502,670 | Great Britain | Mar. 20, 1939 |